Oct. 17, 1939.   R. N. FALGE   2,176,215
HEADLIGHT TESTER
Filed Feb. 24, 1936   5 Sheets-Sheet 1

Inventor
Robert N. Falge
By Blackmore, Spencer & Flint
Attorney

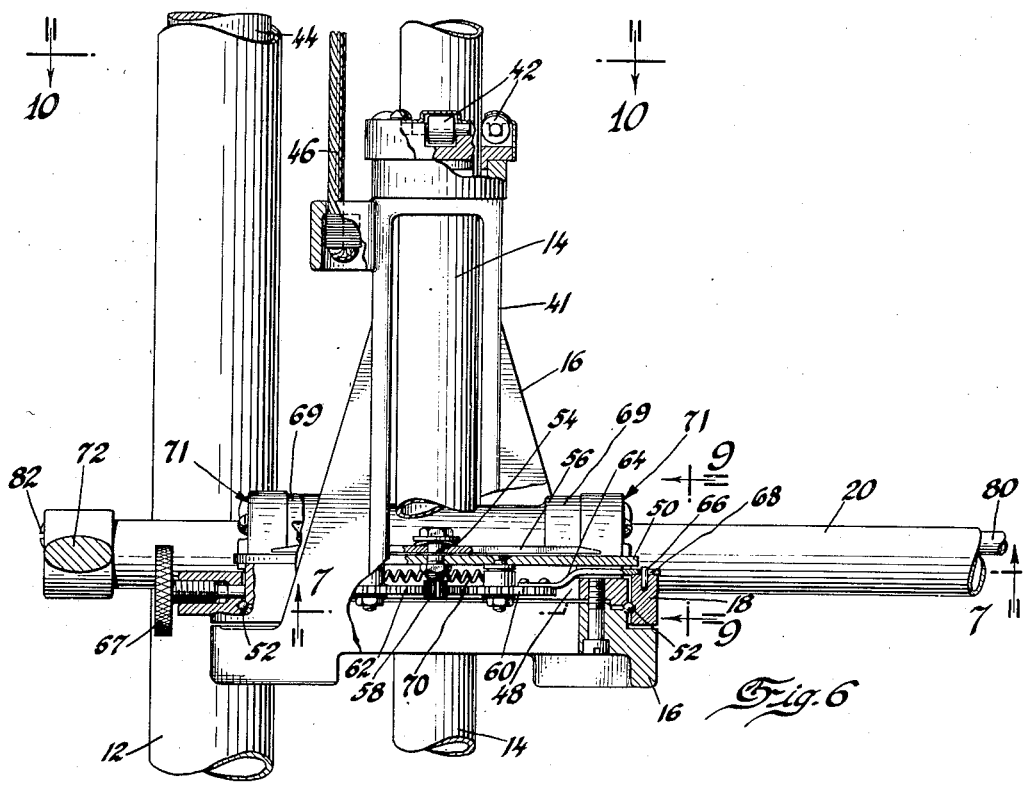
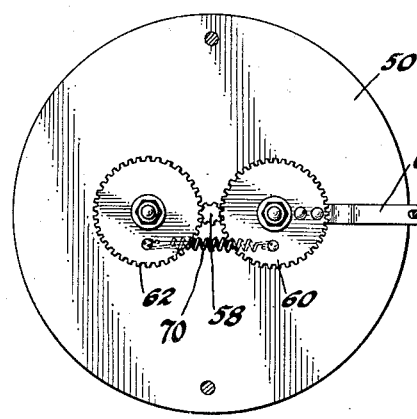
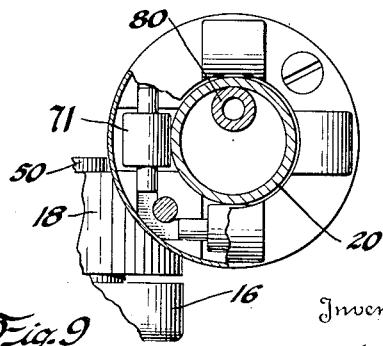

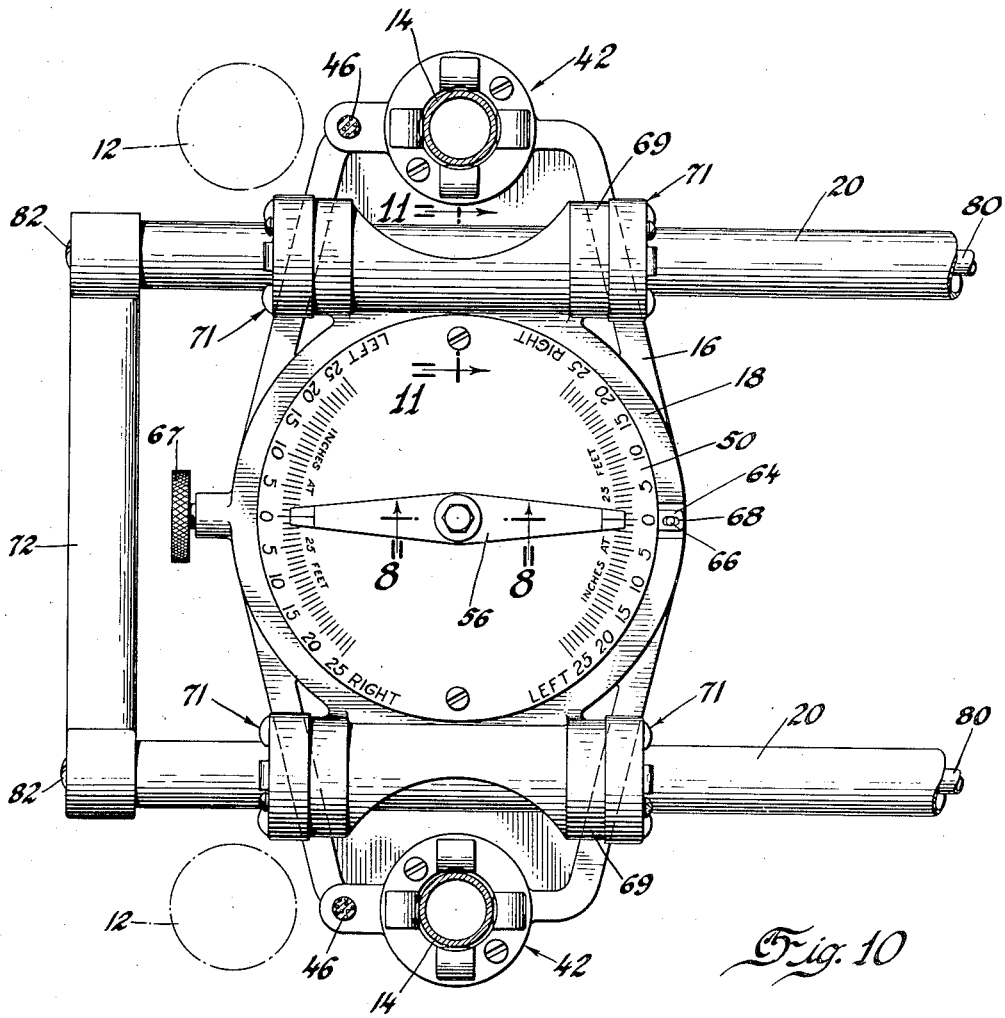
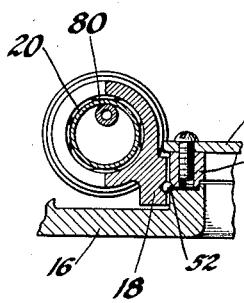

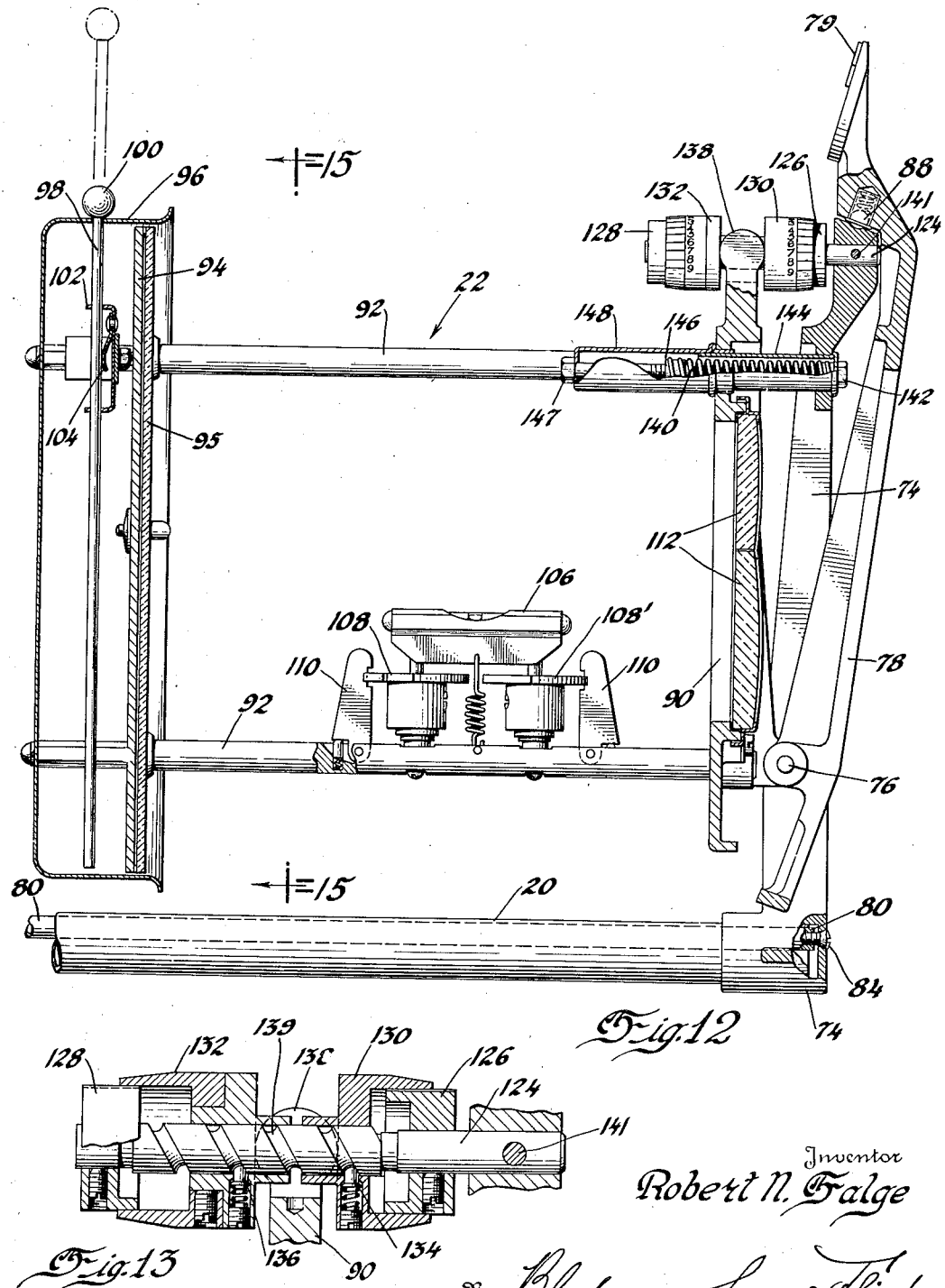

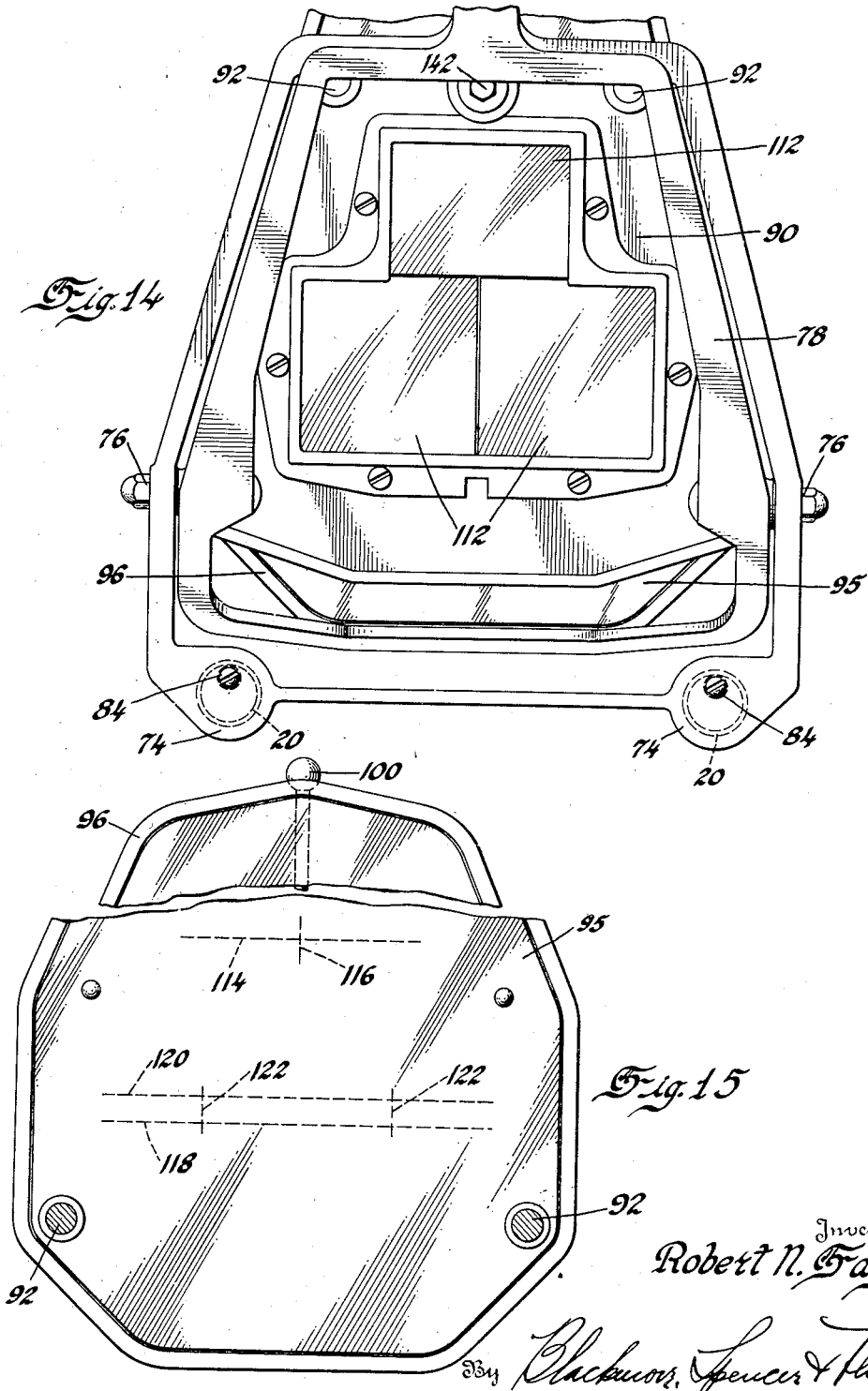

Patented Oct. 17, 1939

2,176,215

UNITED STATES PATENT OFFICE 2,176,215

HEADLIGHT TESTER

Robert N. Falge, Anderson, Ind., assignor to General Motors Corporation, Detroit, Mich., a corporation of Delaware Application February 24, 1936, Serial No. 65,218

14 Claims. (Cl. 88—14)

This invention is an improvement on the headlight testing devices described and claimed in the prior patent of Robert N. Falge, No. 2,144,838 granted January 24, 1939, and in the prior application of Robert N. Falge and George W. Onksen, Jr., Serial No. 37,841, filed August 26, 1935. The tester disclosed in the present application is characterized by accuracy, simplicity, flexibility, portability and low cost.

One of the features of the invention consists in the provision of a single test head adjustably mounted so as to be adapted for positioning in front of each of the headlamps, thereby avoiding the necessity of employing two heads.

The tester likewise embodies novel means for alining the head with the car. To accomplish this, suitable sights are provided, and provision is made for swiveling as well as vertically adjusting the head so as to effect the desired alinement.

A number of refinements in detail assure accuracy in operation. Thus, accurately adjusted anti-friction bearings guide the movements of the supporting means for the head. To overcome errors introduced by bending of the supporting bars for the head, these are preferably made hollow and are provided with tension rods preferably offset upward in the tubes.

For the convenience of the operator dials are provided, one indicating the vertical tilt of the test head, and another indicating the lateral aim of the test head. In addition, the usual adjustable level is provided for convenience in aiming.

Various other features of the invention will be pointed out.

In the drawings:

Figure 6 is a side elevation of the cross head carrying the test head and the supports therefor.

Figure 7 is a fragmentary view on line 7—7 of Figure 6 looking in the direction of the arrows.

Figure 8 is a section on line 8—8 of Figure 10.

Figure 9 is a fragmentary view taken on line 9—9 of Figure 6.

Figure 10 is a fragmentary top plan view taken on line 10—10 of Figure 6.

Figure 11 is a section on line 11—11 of Figure 10.

Figure 12 is a view partly in longitudinal section through the test head and its supports.

Figure 13 is a longitudinal section through the adjusting means for changing the vertical tilt of the test head.

Figure 14 is a front view of the test head and its supports.

Figure 15 is a view taken on line 15—15 of Figure 12.

Figure 1:
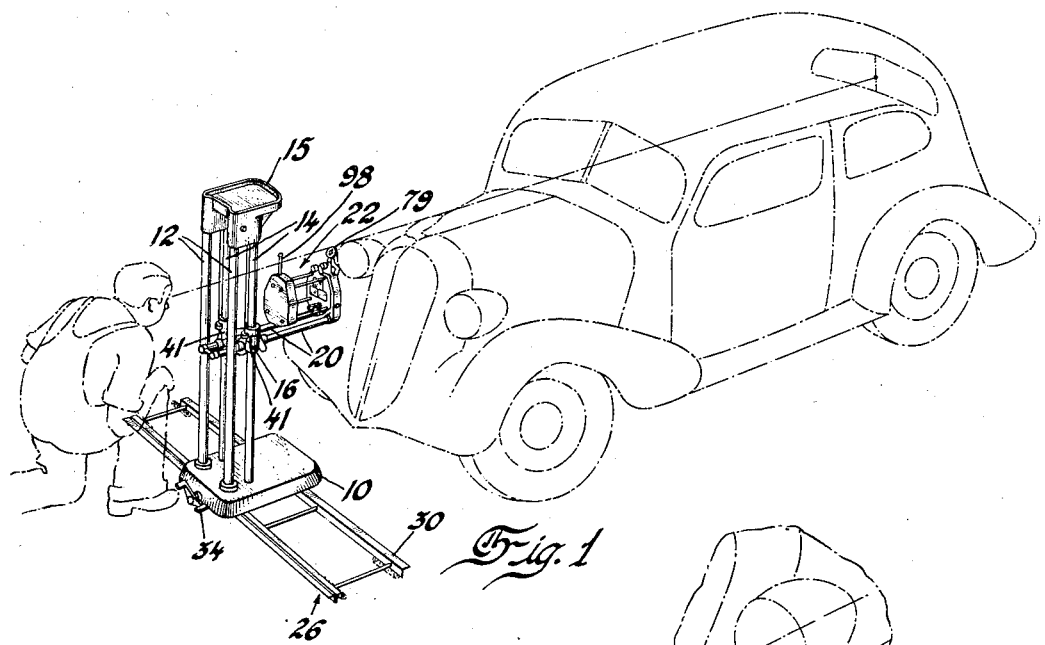
Figure 1 is a perspective view showing the tester in use.
Figure 2:
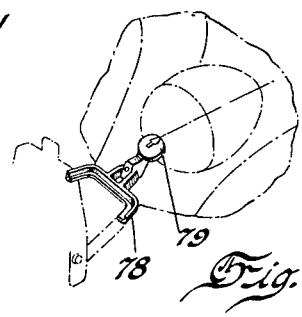
Figure 2 is a fragmentary perspective view showing the method of alining the test head with the headlamp.

10 indicates the base of the tester. From the base 10 extend upwardly the rear supporting posts 12 and the front supporting posts 14 which carry at their upper ends a top 15 made in the form of a tray to hold tools and parts. The posts 14 also serve as guides for the cross head 16 on which is swiveled the turntable 18 in which are slidably mounted the horizontal supporting bars 20 for the test head indicated as a whole at 22.

Figure 4:
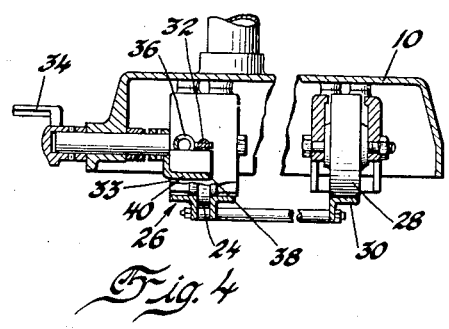
Figure 4 is a transverse section through the carriage shown in Figure 3.
Figure 5:
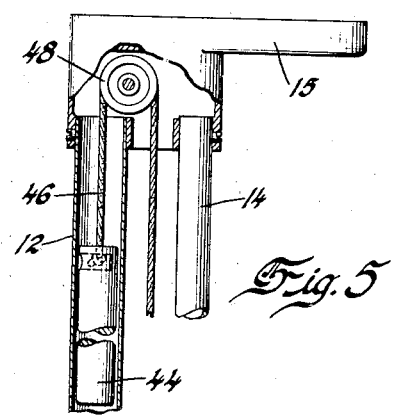
Figure 5 is an end elevation, partly broken away, showing the upper portion of the test head support.

The base 10 is provided with flanged wheels 24 adapted to ride in a grooved trackway shown at 26. Base 10 likewise carries plain rollers 28 adapted to ride on a flat trackway 30 as shown in Figure 4. The trackways 26 and 30 may be made of angle iron, bolts and spacers, assembled as shown in Figures 1 and 4, and are preferably fixed in the floor of a garage by setting them in cement, after first making sure they are level.

Figure 3:
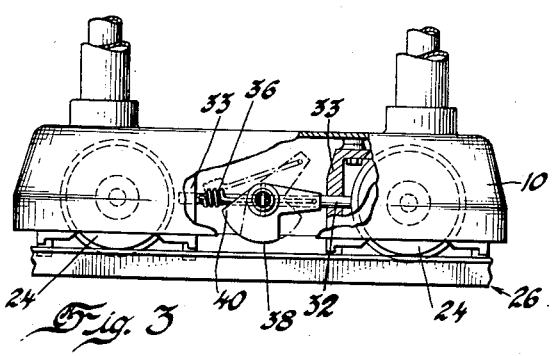
Figure 3 is a fragmentary side elevation, partly broken away, showing the carriage of the tester and the brake mechanism.

With this arrangement the base 10 may be moved to one side or the other of the car so as to present the test head in a convenient position to test either of the headlamps or it may be moved further to the side to permit the car to pass by. To hold the tester in any position to which it may have been adjusted, there is provided a brake in the form of a rod 32 suitably guided as shown in Figure 3 in apertures in shrouds 33 surrounding the wheels of the base. The brake 32 is moved to braking position by swinging the pedal 34 in a direction to apply tension to spring 36 connecting one end of the brake rod 32 with lever 38 secured to the pedal shaft. The brake is held in brake applying position by the action of the spring since the spring 36 pulls in a direction out of line with the brake pedal shaft and the point of connection of the spring to the lever 38. The opposite end of the lever 38 is provided with a flanged stop portion 40 which engages the brake rod 32, and limits the rotation of the pedal shaft.

There is shown in Figure 3, in dotted lines, the position of the parts when the brake is released. In this position the tension of the spring 36 is relieved, reducing the pressure of the brake 32 on the wheel 24, and as the pull of the spring is now on the other side of the line of centers, the brake and brake pedal 34 are held in off position.

Cross head 16 is provided at opposite ends with sleeves 41 within which are received the posts 14. The sleeves 41 preferably carry roller bearings 42 performing the usual function of reducing friction, and accurately alining the sleeves on the posts.

The cross head 16 and the parts carried by it are preferably counterweighted by means of weights 44 housed within the posts 12, and connected to the cross head by means of cords 46 extending upwardly over pulleys 48 housed in the stand 15, the cords passing downwardly and being connected to the cross head as shown in Figure 6.

Cross head 16 is centrally apertured, as shown in Figure 6, and to it is bolted a member 48 to which is secured dial plate 50. The outer adjacent edges of members 16 and 48 are spaced to receive anti-friction balls 52 which likewise seat in a suitable groove in turntable 18. There is centrally mounted in the plate 50 a spindle 54 to the upper end of which is frictionally secured pointer 56, while on the lower end of the spindle there is secured the pinion 58 meshing with gears 60 and 62 mounted on suitable spindles secured to dial plate 50. Gear 60 is connected by arm 64, pin 66 and slot 68 to the turntable 18. Gears 60 and 62 are connected by spring 70 so as to take up any lost motion between the meshing gears.

With this arrangement, it will be apparent that upon rotation of the turntable 18 through small angles the gear 60 is rotated through the connection 64 resulting in rotation of the spindle 54 and movement of the pointer 56. The frictional mounting of the pointer 56 on the spindle 54 permits it to be set to zero position as desired. A set screw 67 threaded in the turntable 18 may be advanced to bear against member 48 to lock the turntable in adjusted position.

The turntable 18 carries sleeves 69 slidably receiving the horizontal supporting bars 20 on which the test head 22 is mounted. Sleeves 69 are preferably provided with roller bearings 71 to reduce friction and secure good alinement. The supporting bars 20 are connected at one end by handle 72, and at the other end by frame member 74 carrying the horizontal pivots 76 for supporting the apertured frame 78 carrying pointer 79, and the test head 22.

To prevent error resulting from flexing of the tubular supporting bars 20, there is preferably inclosed in each of them a tension member 80 offset upward above the center of the tubes and extending the full length thereof, and having one end engaged by adjusting screws 82 mounted for rotation in the handle member 72 and the other end engaged by adjusting screws 84 mounted for rotation in the frame member 74. By adjusting the screws 82 and 84 the rod 80 may be placed under sufficient tension to offset the weight of the test head assembly and maintain the bubble in the center of the level tube throughout the entire range of movement of the test head assembly.

The apertured pointer carrying frame 78 is provided with a spring pressed detent 88 adapted to be received in a notch in the frame member 74 to hold it in upper position as shown in Figure 12.

The test head is of substantially the same construction shown in the prior application of Falge and Onksen, Serial No. 37,841, except that no provision is made for measuring intensity of light. The test head comprises a lens carrying frame 90 connected by struts 92 to target 94, consisting of a sheet of metal, preferably painted white, and covered by a sheet of glass 95. Mounted on the struts 92 behind the target 94 is the shroud or housing 96.

There is slidably mounted in the housing 96 the sighting rod 98 provided with an enlarged head portion 100, preferably of rubber, so as to serve as a bumper as well as a handle. The rod 98 is mounted in a suitable guide 102 secured within the housing 96, and a suitable leaf spring 104 may be provided to bear against it and hold the rod in adjusted position.

Upon one of the lower rods 92 there is preferably mounted an adjustable level 106, the inclination of which may be adjusted by rotating one or the other of the posts 108, 108' on the upper ends of which the level is fulcrumed. Suitable spring pressed dogs 110 hold the posts in adjusted position. The frame 90 contains spherical condensing lenses 112, preferably three in number. The upper lens is arranged in alinement with horizontal reference mark 114, and vertical reference mark 116 on the screen 94, while the lower lenses 112 are similarly located with respect to horizontal reference marks 118 and 120 and vertical reference marks 122 on the same screen.

To permit of accurate adjustment of the vertical tilt of the test head the following arrangement is provided. A threaded stud 124 is secured to the frame 74. The stud carries at opposite ends the fixed collars 126 and 128, and the rotatable collars 130 and 132 possessing spring pressed detents 134 and 136, respectively, engaging in the thread 139 on the stud 124.

The frame 90 is provided with a forked portion 138 having rounded ends adapted to be received between the adjusting nuts 130 and 132. As shown in Figure 12 the nuts are calibrated, and a suitable reference mark is provided on each of the fixed collars 126 and 128, preferably at the top, to provide a reference point.

To make adjustment easier the frame 74 is connected to the test head by tension spring 140 having its ends secured to nut 142 mounted for rotation in sleeve 144, and to nut 146 threaded on bolt 147 mounted for rotation in sleeve 148. Sleeves 144 and 148 are mounted in apertures in the frame members 74 and the lens frame 90 as shown and have telescopic engagement with each other. The bolt 147 is adjusted to put the spring 140 under sufficient tension to balance the weight of the test head, and to yieldingly hold the fork 138 against the forward adjusting nut 130.

It will be remembered that the tracks 26 on which the tester runs are carefully levelled before being cemented into the floor. The motor vehicle stands either on a level floor or on floor plates which are leveled prior to being cemented into place. In actual practice slight variations will be found between the level of these parts and true level. These errors must be compensated for before the machine is put in use. The first operation is to check the error in level of the floor. This error is measured with a straight edge, and correction is made by adjusting rear post 108' under the level. Front post 108 is then set at zero. The tester is then located in a position representing the location in front of one of the headlamps. The two dials 130 and 132 above the test head are then set at zero which locks the projection 138 of the test head in position. Set screw 141 is then loosened and the entire upper dial assembly, which is mounted on shaft 124, is moved ahead or back until the bubble in the level 106 centers. Set screw 141 is then locked lightly in position. The machine is then moved over to the corresponding position in front of the other headlamp. The two upper dials are rotated until the bubble centers. The difference between the readings on the said two upper dials and the zero reading is noted and the two upper dials are set for one-half this difference. Set screw 141 is then loosened, and the upper dial assembly moved ahead or back until the bubble centers, whereupon set screw 141 is locked in place. The installation is now ready for use.

In the use of the headlight tester an automobile is driven into the position shown in Figure 1, and the first thing the operator does is to line up the head with the car axis by moving the tester sideways on its track and at the same time swiveling the test head assembly to right or left until the rod 98 is alined with the center of the top of the radiator and the center of the rear window. With this done the set screw 67 is moved to locked position. The test head axis is now in line with the longitudinal axis of the automobile.

Next the tester is moved sidewise on the tracks until it is in front of one of the headlamps, and the apertured frame 78 is swung down to horizontal position, and the head is further adjusted up or down so that the arrow 79 points to the center of the head lamp lens. The foot pedal 34 is moved to braking position to hold the parts adjusted.

When the tester is used to focus and aim headlamps in service the remaining procedure is the same as in the case of the double head tester described in the prior application of Falge and Onksen, Serial No. 37,841, previously referred to. When the tester is used to check the focus and aim of headlamps on vehicles to determine how much the aim is in error, the operation is somewhat different. First the test head is lined up with the car axis as previously described, and the movable pointer 56 on the horizontal dial shown in Figures 8 and 10 is rotated to zero position. The tester is then located in front of one of the headlamps, set screw 67 is loosened, and the tester is aimed sidewise, keeping the arrow 79 on frame 78 centered on the lens, until the beam patterns indicate that the test head is lined up with the headlamp beam. Pointer 56 then records the amount that the head lamp is aimed to one side of its correct position in terms of inches at 25 feet, thereby measuring the error in sidewise aim of the beam and determining whether it is within the prescribed limits. In connection with the tester there is a wall chart which designates the settings of upper dials 130 and 132 which correspond to various types of vehicles as regards wheel base and load distribution. Suppose the car to be checked is a short wheel base five-passenger sedan. Let us say that the specified dial settings are 0 and —6. The dials are set at these positions. The spring loading mechanism holds the projection 138 on the test head against the front dial 130. According to one method of inspection the inspector notes the position on the target 94 of the hot spot of the upper beam with reference to the horizontal lines, and observes whether that hot spot is aimed lower than the prescribed limits for illumination. If the beam is aimed too low then approval is refused. If the beam is aimed higher than the prescribed level, he then presses the test head to force the projection 138 against the rear dial 132 and notes whether the hot spot comes above the specified line, and if it does the job is refused approval because the beam is aimed too high.

The lower beam may be checked by a similar method.

The operation of the spring loading mechanism may be reversed, if desired, in such manner that the spring will permit the projection on the test head to rest against the rear dial 132. In that case the head would have to be lifted to make it register against the front dial 130. The arrangement of this spring loading device depends on the particular practices adopted in connection with the inspection of lamps, and depends on which is going to be more convenient from the standpoint of the operator.

Assuming that the check shows that the headlamps need adjustment, the operation then is to rotate the test head assembly until pointer 56 registers on zero which again lines up the test head axis parallel with the vehicle axis. The dials 130 and 132 are then set at the correct positions as determined from the chart. The headlamp mounting bolt is then loosened and the headlamp aimed approximately straight ahead. The tester as a whole is then moved sidewise, and the test head moved up or down, and ahead or back until the arrow head on the pointer registers on the center of the lens. The headlamp is then aimed accurately to locate the patterns on the target at the specified position with reference to the horizontal and vertical lines on the target.

The construction is susceptible of considerable modification without departing from the spirit of the invention.

I claim:

1. In a headlight tester the combination of a support, a cross-head mounted for vertical adjustment on said support, a turntable pivoted to said cross-head for oscillation in a horizontal plane, a supporting frame slidably mounted on said turntable, and a test head including a substantially vertical target for receiving light from an automobile headlight mounted on said frame.

2. In a headlight tester the combination of a support, a turntable pivotally mounted on said support, a test head carried by said turntable including a target arranged to receive light from an automobile headlamp, a dial secured to said support, a pointer cooperating with said dial, and a friction drive between the turntable and the pointer adapted to cause the pointer to register movements of the turntable or to be independently adjusted as desired.

3. In a headlight tester the combination of a track adapted to be secured to the floor of a garage or test station in level, horizontal position, a supporting stand mounted on the track having means cooperating with the track to confine the stand for movement therealong, and a test head comprising a lens and a target spaced from said lens along the optical axis thereof, said test head being adjustably mounted on the supporting stand with the optical axis of said lens normally substantially horizontal and extending substantially at right angles to the track, whereby the test head may be shifted along the track from one headlamp to the other while maintaining the stand level and in predetermined relation to the track.

4. In a headlight tester the combination of a track adapted to be secured to the floor of a garage or test station in level, horizontal position transverse to the longitudinal axis of the vehicle whose headlamps are to be tested, a supporting stand mounted on the track having means cooperating with the track to confine the stand for movement therealong, and a test head including means for receiving light from an automobile headlamp, adjustably mounted on the supporting stand with its optical axis normally substantially horizontal and extending longitudinally toward the headlamp to be tested, said axis lying in a plane extending substantially at right angles to the track, said adjustable mounting including means mounting the test head so it may be raised or lowered, means mounting the test head for swinging adjustment from one side to the other about a vertical axis, and means mounting the test head for tilting adjustment about a horizontal axis at right angles to said plane.

5. In a headlight tester the combination of a track adapted to be secured to the floor of a garage or test station in level, horizontal position transverse to the longitudinal axis of the vehicle whose headlamps are to be tested, a supporting stand mounted on the track having means cooperating with the track to confine the stand for movement therealong, and a test head including means for receiving light from an automobile headlamp, adjustably mounted on the supporting stand with its optical axis normally substantially horizontal and extending longitudinally toward the headlamp to be tested, said axis lying in a plane extending substantially at right angles to the track, said adjustable mounting including means mounting the test head so it may be raised or lowered, means mounting the test head for longitudinal shifting of the test head toward and from the headlamp along its axis, means mounting the test head for swinging adjustment from one side to the other about a vertical axis, and means mounting the test head for tilting adjustment about a horizontal axis at right angles to said plane.

6. In a headlight tester the combination of a base, a pair of supporting posts extending upwardly from the base, rigid means connecting said posts at their upper ends, a cross-head having portions slidably guided on the posts, a turntable swiveled on the cross head on a vertical axis, horizontal guideways on said turntable, spaced supporting bars slidably mounted in said guideways, rigid means connecting the ends of said bars, and a test head including means for receiving for test light from an automobile headlamp pivoted on said bars on a horizontal transverse axis.

7. In a headlight tester the combination of a base, rigid supporting means extending upwardly from the base and having a vertical guideway thereon, a cross-head having a portion slidably guided by said guideway, a turntable swiveled on the cross-head on a vertical axis, a horizontal guideway on said turntable, a support having a portion slidably guided in said horizontal guideway, and a test head including means for receiving for test light from an automobile headlamp pivoted on said support on a horizontal axis for movement in a vertical plane.

8. In a headlight tester the combination of a support, spaced parallel horizontal guides on said support, tubes slidable in said guides, means connecting the tubes to form a rigid supporting frame, a test head for headlights supported on said frame adjacent one end thereof, tension members extending through said tubes, and means connecting the tension members to the tubes adapted to place the tension members under tension to prevent deflection of the tubes under the load of the test head.

9. In the combination as defined in claim 8, said tension members being arranged with their axes above the axes of the tubes to increase the resistance to deflection.

10. In a headlight tester the combination of a supporting stand comprising a base, two pairs of spaced parallel guide posts extending upwardly from the base, means connecting the upper ends of the guide posts and holding them in fixed relation, a test head including a target adapted to receive light from an automobile headlamp, a support for said test head having portions slidably guided on a pair of said posts, and counterweights connected to said support and slidably guided by the other pair of posts.

11. In a headlight tester the combination of a support, a test head having an optical axis extending longitudinally thereof, said test head pivoted to the support on a horizontal pivot extending transversely of the test head, said head comprising a target adapted to receive light from an automobile headlamp, and means for varying the pivotal adjustment of the head comprising a threaded shaft member extending longitudinally of said test head and transversely of said horizontal pivot, spaced indexing means threaded on said shaft and a projection member extending between said spaced indexing means, one of said members being secured to said test head and the other of said members being secured to said support.

12. In the combination as defined in claim 11, means yieldably connecting the test head and support for holding the projection member against one of said indexing means for facilitating the checking of the headlight beam projected upon the target.

13. In a headlight tester the combination of a support, a turntable pivotally mounted on the support for rotation about a substantially vertical axis, a test head carried by said turntable including a target arranged to receive light from an automobile headlamp, an indicator for indicating the amount of turning movement of the turntable including a movable member and a stationary member, one of said members having a number of graduations thereon, the other of said members having a graduation serving as a pointer cooperating with the graduations on said first mentioned member for indicating the amount of movement of the movable member, and means operated by movement of the turntable for actuating the movable member including means for multiplying the amount of movement of the movable member compared with that of the turntable.

14. The combination of a test head comprising a lens support, a lens mounted therein, a target spaced from the lens, alined, independent sighting elements adjustably connected to the target and to the lens support said elements lying substanially in a plane including the optical axis of the lens, rotatable means mounting said test head for rotation about a vertical axis, and a laterally shiftable support receiving said rotatable means and said head in supporting relationship whereby said test head may be moved laterally with said support and also rotated about a vertical axis to facilitate alinement of said head with a headlamp with the aid of said sighting elements.

ROBERT N. FALGE.